US007788719B1

(12) United States Patent
Hernacki (10) Patent No.: US 7,788,719 B1
(45) Date of Patent: Aug. 31, 2010

(54) GRAPH BUFFERING (75) Inventor: Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1026 days.

(21) Appl. No.: 11/388,577

(22) Filed: Mar. 23, 2006

(51) Int. Cl.
*G06F 21/00* (2006.01)

(52) U.S. Cl. .............................. 726/22; 726/23; 726/24; 726/25

(58) Field of Classification Search .............. 726/22–25
See application file for complete search history.

(56) References Cited

U.S. PATENT DOCUMENTS 5,740,355 A * 4/1998 Watanabe et al. ............. 714/45
7,171,683 B2 * 1/2007 Pazi et al. ...................... 726/13
7,421,737 B1 * 9/2008 Hernacki et al. .............. 726/22
7,447,184 B1 * 11/2008 Kharvandikar et al. ....... 370/338
7,519,995 B2 * 4/2009 Cho et al. ...................... 726/22
2003/0084319 A1 * 5/2003 Tarquini et al. ............. 713/200
2003/0084322 A1 * 5/2003 Schertz et al. .............. 713/200

* cited by examiner

*Primary Examiner*—Nasser Moazzami
*Assistant Examiner*—Ghazal Shehni
(74) *Attorney, Agent, or Firm*—Hunton & Williams LLP (57) ABSTRACT

Providing network security is disclosed. If it is determined that a next portion of a data stream being reconstructed has more than one possible data value, each possible data value for the next portion is stored in a corresponding storage location associated with the data stream. Each storage location in which a possible data value for the next portion is stored as a next location with respect to a storage location in which a previous data value for a previous portion that immediately precedes the next portion in the data stream is stored is identified.

20 Claims, 6 Drawing Sheets

GRAPH BUFFERING

BACKGROUND OF THE INVENTION

Administrators rely on systems such as network intrusion detection systems (IDS), network intrusion prevention systems (IPS), and other devices such as firewalls to provide timely and accurate information about threats to their network assets.

Central detection nodes generally monitor traffic for all hosts that they protect and attempt to predict the impact of any activity seen on a destination host. Due to the numerous ways in which destination hosts can vary (e.g., operating system, patch level, applications, configurations, etc.) an attacker may be able to send diversionary packets (such as by obfuscating attack signatures and known threat patterns) that enable a data stream to carry an attack to a victim host without alerting an IDS (e.g., because the packets sent are reconstructed on the IDS in a way that is different than on the victim host), or conversely, to deceive an IDS into believing that a particular attack is being attempted when it is not.

Additionally, even if the central node is aware of the entire end host context, a considerable amount of resources such as processing power and storage is required to evaluate all traffic in the context of each destination host, and considerable work would be required to ensure the context information at the security system was accurate and up to date.

Therefore, it would be desirable to have a better way to detect/prevent evasive attacks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
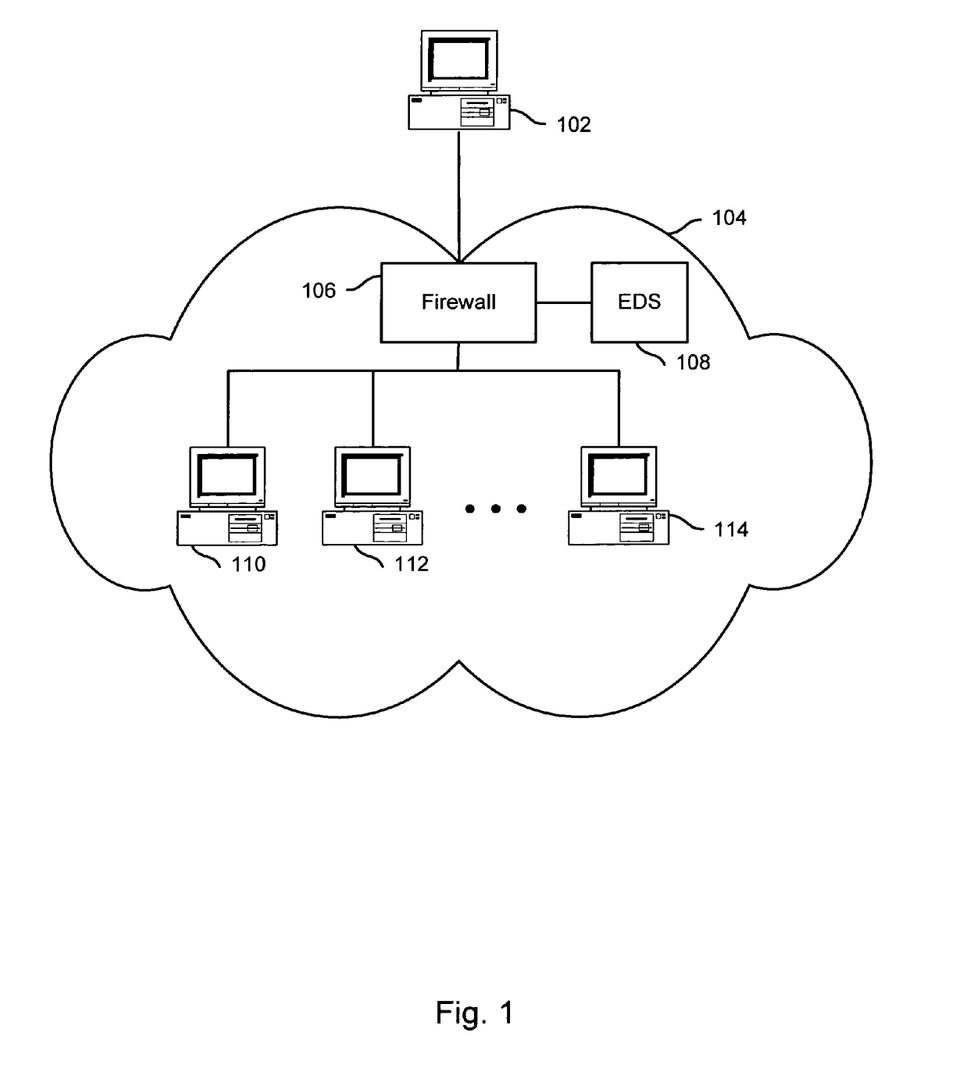
FIG. 1 is a diagram illustrating an embodiment of a system having evasion detection.

FIG. 1 is a diagram illustrating an embodiment of a system having evasion detection. An attacker 102 sends an attack to one or more hosts (110-114) on network 104. Routed through firewall 106, data sent from attacker 102 are transmitted with the intent to evade evasion detection system (EDS) 108. EDS 108 may be implemented as part of a network intrusion detection system (IDS), a network intrusion prevention system (IPS), firewall, proxy server, or other security application. In some embodiments, EDS 108 is implemented as a standalone application or utility.

Conceptually, rather than being stored sequentially, a stream of packets may be stored in memory in a seemingly random jumble. For example, a capture layer may obtain packets off a wire and store them in a cyclical buffer, in whatever order is most efficient. How the segmented/fragmented packets form TCP flows, for example, may be determined by stream assembly logic and packet records that reference which packet comes next after a previous packet for a particular stream. As described in more detail below, a variety of methods may be used to determine which packet is next in a sequence. For example, a record may have a "next packet" field that shows where the next packet is stored. A meta-record may also be used that contains pointers in sequence to each of the packets in a stream. As used herein, "next packet" and "next packet value" may be any implementation, as appropriate, that helps define the sequence of packets in a stream.

The assembled streams typically are then passed on to one or more higher order detection layers, such as a pattern matcher, which expects to see a stream of bytes that appear, for example, to be HTTP commands.

Typically, a sensor (e.g., IDS) will not have enough information to accurately reassemble network packets into a form identical to the intended destination (e.g. host 110). If the sensor assembles the packets incorrectly, it will process a different version of the traffic than the end host will. As described in more detail below, many forms of network evasion rely on these ambiguities.

Figure 2A:
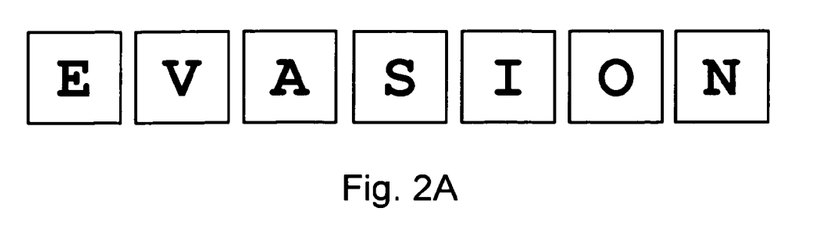
FIG. 2A illustrates an example of a packet stream.

FIG. 2A illustrates an example of a packet stream. In the example shown, "EVASION" is an unambiguous pattern (made up of "packets" E, V, A, etc.) known to EDS 108 which, when detected by EDS 108, signals that an attacker is attempting to perpetrate an attack. This may occur, for example, if the attacker is a novice making use of a known attack script.

An attacker, such as attacker 102, can attempt to evade EDS 108 by sending data that masks or obfuscates pattern matching and exploits the manner in which received data is handled at a destination host (e.g., 110), EDS 108, or one or more intermediate network node.

An evasive data flow or stream may contain additional packets to obfuscate or prevent an IDS from learning that an attack is being delivered to a victim host. Likewise, packets may be included that cause an IDS to determine that an attack is taking place when in fact the packets comprising the attack never reached the target host, resulting in a false detection event. As used herein, packets, segments, fragments, frames, or other forms of encapsulating data are referred to as "packets." Also used herein, a "packet stream" means a sequence of bytes that can be collected and ordered, and is not limited to any particular transport method.

Examples of evasions that may be performed include adjusting packet header information such as time-to-live (TTL) values or other options, and masking the overall attack signature of a data flow by altering individual data packets and their headers to create unrecognizable, unmatchable and/or innocuous patterns and signatures.

Figure 2B:
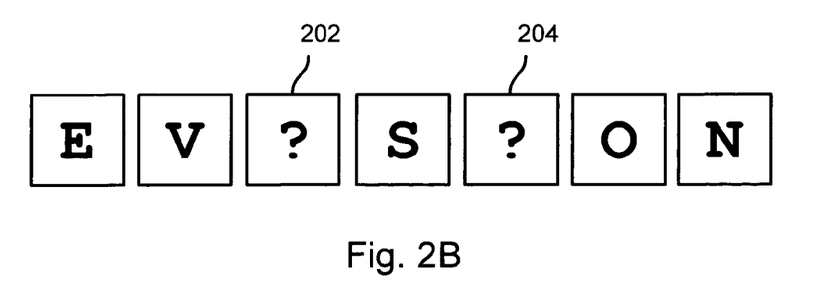
FIG. 2B illustrates a representation of a packet stream having ambiguities.

FIG. 2B illustrates a representation of a packet stream having ambiguities. Suppose case variations (lower vs. upper case) are employed as a way of attempting to disguise an attack. To a binary pattern matcher, "EVASION" may represent a known attack signature, while "eVASION"—though equally threatening—may not.

In the example shown, the third (202) and fifth (204) packets are each ambiguous. These variations are of order two—two possible variations (lower and upper case) exist.

When a sensor encounters an ambiguity, it could choose what it considers to be the most likely or common way to reassemble the packets and then scan the results. For example, the sensor may choose to normalize all packets to uppercase (e.g., "EVASION"). Differences in protocols, the ways different applications canonicalize information, and differences in encodings (e.g., UTF-8) all make it difficult for the sensor to determine which way to reassemble the packets. If the sensor reassembles the packets differently than the attack target, an attack may be perpetrated without the sensor detecting it.

One way of addressing ambiguities is called bifurcated analysis. In this approach, whenever the sensor encounters an ambiguity, it replicates the entire stream (e.g., allocates additional buffers) as required to assembles all possible variants, and then scans each. In doing so it will determine which, if any, contains a threat.

Figure 2C:
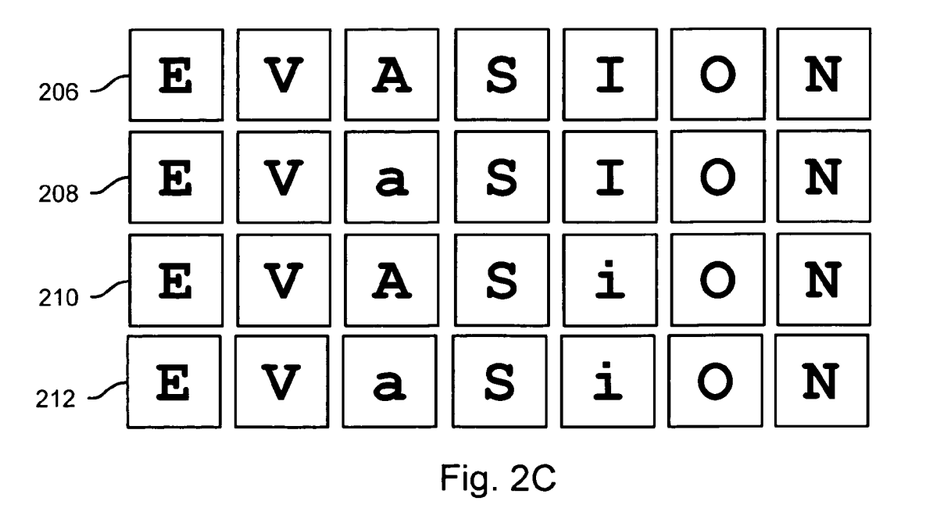
FIG. 2C illustrates permutations of a packet stream having ambiguities.

FIG. 2C illustrates permutations of a packet stream having ambiguities. In example shown, brute force bifurcated analysis would require storing (and matching for) each of the four permutations (206-212).

When the string is short (in this example, seven "packets") and the ambiguities are of low order, the resulting increase in storage requirements in using bifurcated analysis may appear manageable. However, an EDS may monitor over a million concurrent flows. If even 2 kb per flow of state data is maintained per flow, state storage (and analysis) can readily require gigabytes or terabytes of memory.

More efficient buffering of data by EDS 108 under ambiguous reassembly conditions is disclosed. In some embodiments, the packet data is stored as a graph, rather than as a series of linear buffers. Rather than each node having a single edge (each packet having a single "next packet" entry), multiple edges (a fork of "next" packets) may be used to indicate a divergence due to ambiguity. In all but the most degenerate cases, a large portion of a network stream is not ambiguous and thus need not be redundantly stored.

In some embodiments, a pattern matcher configured to match across non-continuous sections of memory due to other constraints (e.g., fragment reassembly, zero copy packet stores, etc.), is used. For example, rather than having a single static pointer to the next packet or next part of the stream, multiple next pointers may be used. Other data structures, such as a linked list, may be used as appropriate and indicate, where applicable, that a packet has multiple next packets.

Figure 3A:
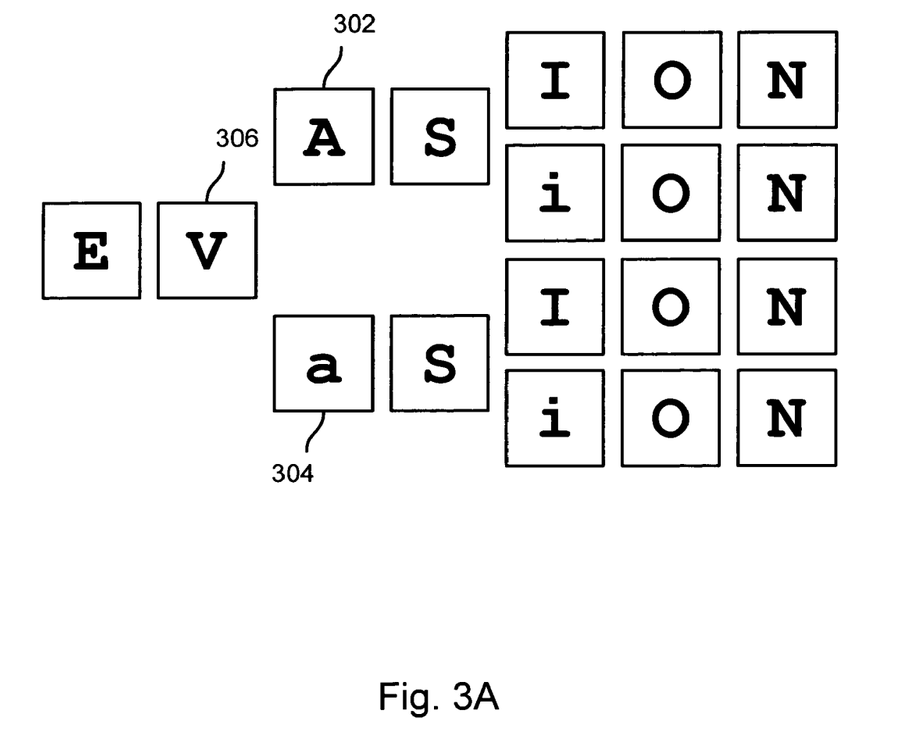
FIG. 3A illustrates an example of a divergent packet stream.

FIG. 3A illustrates an example of a divergent packet stream. As described in more detail below, in the example shown, storage is only duplicated from the point of each ambiguity.

Figure 3B:
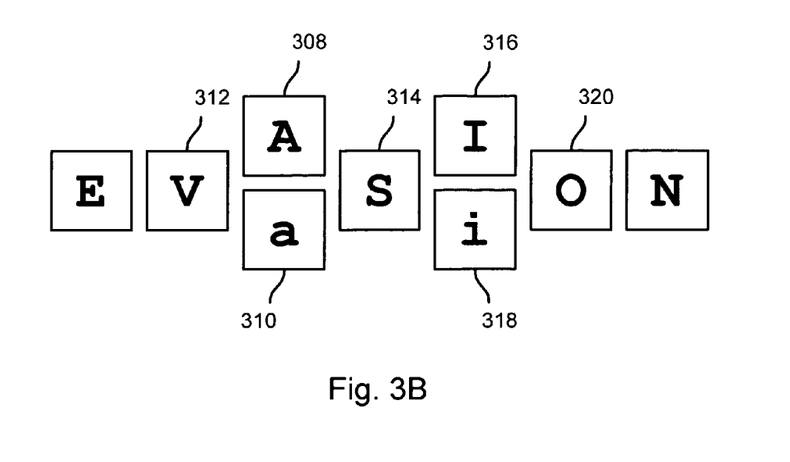
FIG. 3B illustrates an example of a divergent packet stream.

FIG. 3B illustrates an example of a divergent packet stream. In the example shown, and as described in more detail below, additional resources are conserved by determining that the packets reconverge after one or more ambiguities, and updating the packet records accordingly.

Figure 3C:
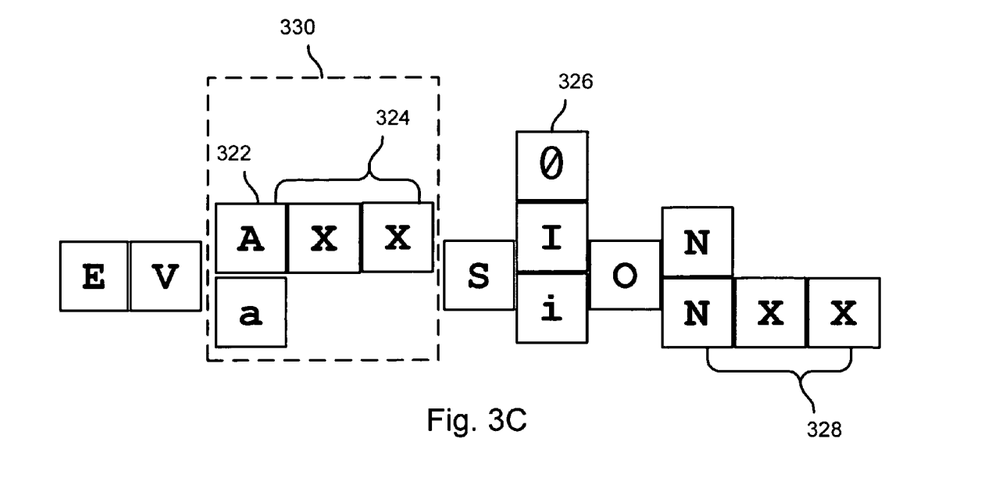
FIG. 3C illustrates an example of a divergent packet stream.

FIG. 3C illustrates an example of a divergent packet stream. In the example shown, more complicated ambiguities are present. Nonetheless, the permutations shown can be stored in a mere 15 bytes. In addition to the original order two variance (322), an order three variance (326) is also present in the stream. Two fragment reassembly evasions (324, 328) are also present. The payload in the third "packet" in the stream (330) may be contained within a single packet ("a"), or it may be fragmented across multiple packets (notated here as "AXX").

Figure 4:
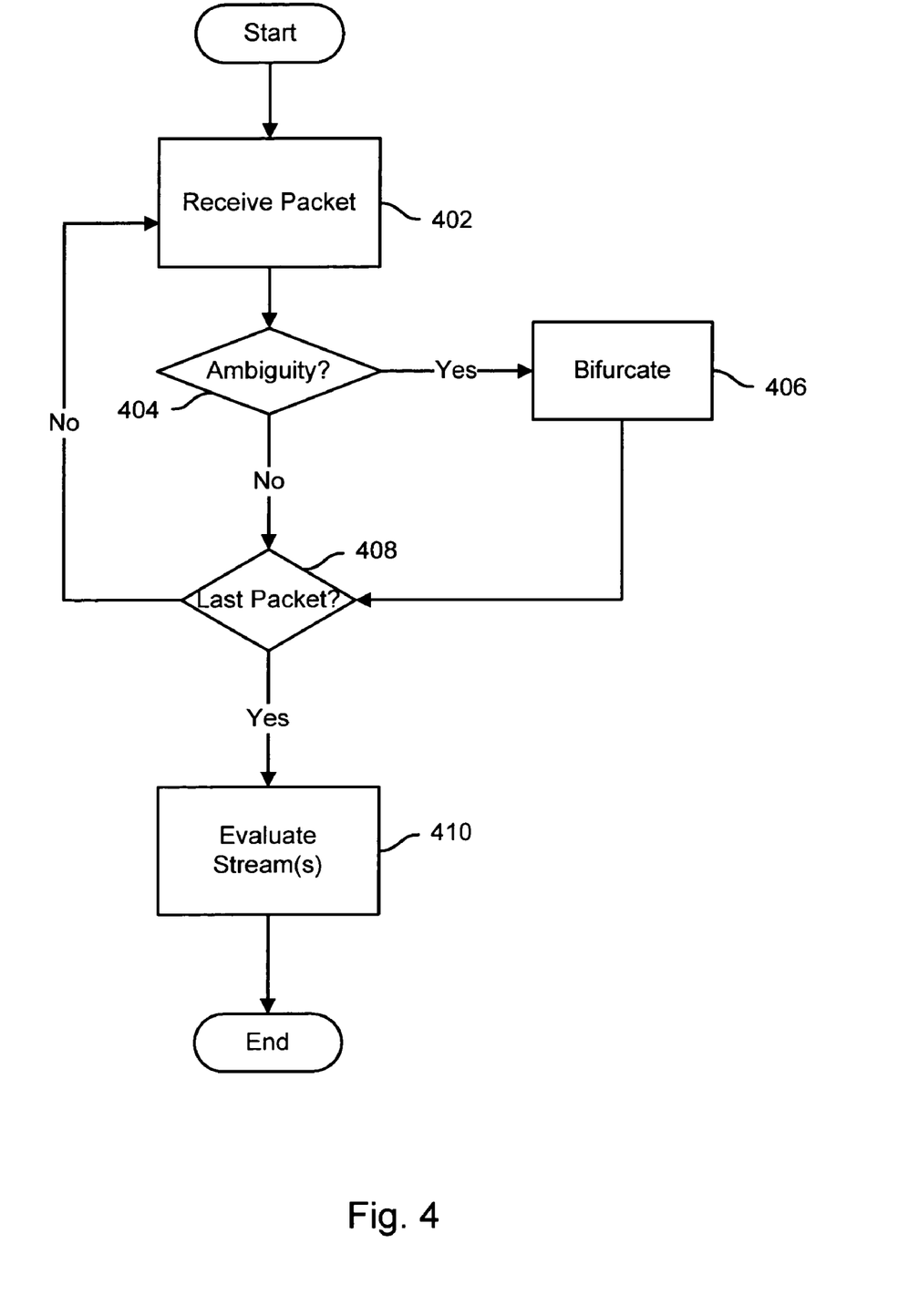
FIG. 4 is a flow chart illustrating an embodiment of a process for analyzing a packet stream.

FIG. 4 is a flow chart illustrating an embodiment of a process for analyzing a packet stream. In the example shown, at 402 a packet is received. The packet may be received at an egress/ingress/edge router to a network, providing a location for a copy to be sent to EDS 108 and eventual forwarding to an end destination, such as host 110. The packet may also be received directly at EDS 108.

Once received, the packet and data included within it are decoded. At 404, it is determined whether an ambiguity has been encountered. In some embodiments, knowledge of the network communication protocols used between hosts outside a protected network and those in the protected network and how packet data is decoded by hosts having the range of operating systems, configurations, patch levels, etc. present in the protected network, are used by an administrator to configure the EDS to detect ambiguities in the sense that the packet may be decoded, de-fragmented, etc. differently in one host on the network than another. If it is determined that an ambiguity has been encountered (404), at 406, the stream is bifurcated. Using the example shown in FIG. 3A, at 406, a portion of the buffer beginning with the ambiguity is allocated for each variant (e.g., packets 302 and 304), and a packet pointing to the ambiguity (306) has its packet record updated to reflect that each of the variants is a "next" packet. This allows the EDS to reassemble multiple versions of the flow without having an entirely separate, and largely duplicative, buffer for each version of the flow (as in FIG. 2C, for example).

In this example, the process continues until the last packet in the stream is received (408). At 410, the stream and its variants are assembled and a pattern matcher traverses each stream and evaluates it for threats. A partial state match prior to the ambiguity could be saved and thus not need to be regenerated.

In some embodiments, recursion is employed. For example, when an ambiguity is encountered, the next iteration of the matching function (410) could be called, once for each ambiguity.

In some embodiments, if an evasion attempt is detected at 410, an alert is generated and sent to a security administrator or application to invoke protective measures, such as blocking the data flow/stream containing an attack. In various embodiments other protective measures, such as blocking or hardening are also invoked as a result of the received alert.

Figure 5:
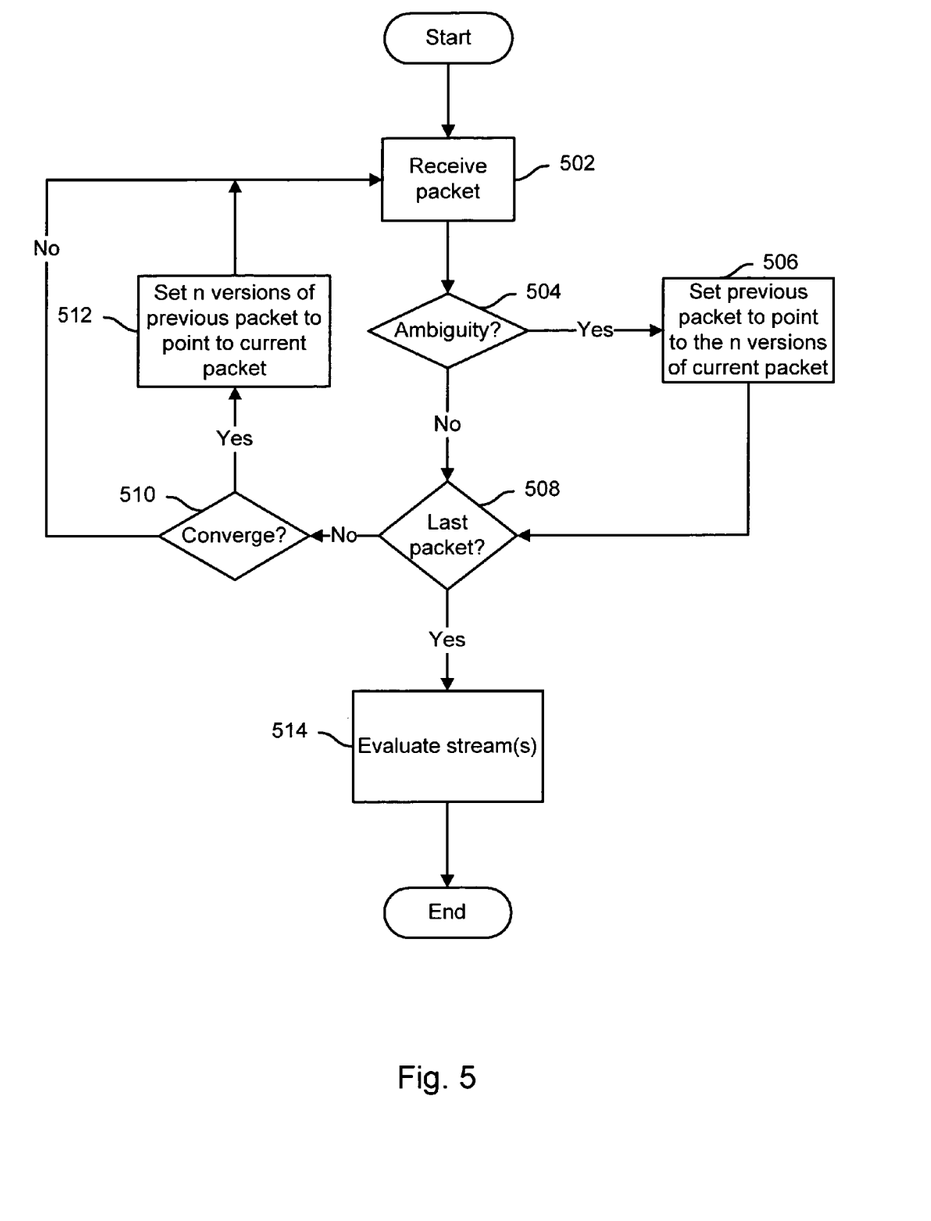
FIG. 5 is a flow chart illustrating an embodiment of a process for analyzing a packet stream.

FIG. 5 is a flow chart illustrating an embodiment of a process for analyzing a packet stream. In the example shown, at 502 a packet is received.

Once received, the packet and data included within it are decoded. If an ambiguity is encountered (504), at 506, a portion of the buffer beginning with the ambiguity is allocated for each variant and the previous packet (pointing to the ambiguity) is updated to point to each of the variants. Using the example shown in FIG. 3B, at 506, packet 312 has its "next packet" value set to packets 308 and 310.

If the packet and/or its payload received at 502 is not ambiguous (504) and not the last packet in the stream (508), at 510, convergence is tested for. In some embodiments, 510 includes determining that the packet streams have converged if the packet stream previously diverged (i.e., a previously received packet was ambiguous) and the current packet is unambiguous (i.e., the same for all variations of the stream). In the example shown in FIG. 3B, packet 314 is unambiguous. Thus, at 512, the "next packet" values of packets 308 and 310 are both set to packet 314. As another ambiguity is encountered (packets 316 and 318), the stream diverges again (506), then finally reconverges (512) with packet 320.

In this example, the process continues until the last packet is received (508). At 514, the stream and its variants are assembled and a pattern matcher traverses each stream and evaluates it for threats.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing network security, comprising:
   determining that a next portion of a data stream being reconstructed has more than one possible data value;
   generating a plurality of possible data values for the next portion of the data stream, wherein each of the plurality of possible data values represents a different version of the next portion of the data stream;
   storing each generated possible data value in a corresponding storage location associated with the data stream; and
   identifying each storage location in which a possible data value for the next portion is stored as a next location with respect to a storage location in which a previous data value for a previous portion that immediately precedes the next portion in the data stream is stored, wherein the storage locations in which the possible data values for the next portion are stored and the storage location in which the previous data value for the previous portion is stored are included in a set of storage locations, each storage location in the set of storage locations containing a data value for an associated portion of the data stream, wherein different combinations of possible data values for portions of the data stream represent different versions of the data stream.

2. The method as recited in claim 1, further comprising processing each version of the data stream to determine if the version includes data associated with an attack.

3. The method as recited in claim 2 wherein processing each version of the data stream to determine if the version includes data associated with an attack comprises determining whether the version includes data that matches an attack signature.

4. The method as recited in claim 2 further comprising, in the event it is determined that a first version of the data stream includes data associated with an attack but a second version of the data stream does not, determining whether the data stream is associated with an attempt to generate a false indication that a target host associated with the data stream is being or has been attacked.

5. The method as recited in claim 2 further comprising, in the event it is determined that a first version of the data stream includes data associated with an attack but a second version of the data stream does not, determining whether the data stream is associated with an attempt to evade detection of an attack on a target host with which the data stream is associated.

6. The method as recited in claim 2 further comprising generating an alert if it is determined that a version of the data stream includes data associated with an attack.

7. The method as recited in claim 2 further comprising generating an alert if it is determined that a first version of the data stream includes data associated with an attack but a second version of the data stream does not include data associated with the attack.

8. The method as recited in claim 1 further comprising determining that a subsequent portion of the data stream that immediately follows said next portion has only one possible data value; storing the one possible data value in a subsequent portion storage location, and identifying the subsequent portion storage location as the next location with respect to each of the storage locations in which a possible value of said next portion is stored.

9. A system for providing network security, comprising:
   a communication interface configured to receive a data stream; and
   a processor configured to:
      determine that a next portion of a data stream being reconstructed has more than one possible data value;
      generate a plurality of possible data values for the next portion of the data stream, wherein each of the plurality of possible data values represents a different version of the next portion of the data stream;
      store each generated possible data value in a corresponding storage location associated with the data stream; and
      identify each storage location in which a possible data value for the next portion is stored as a next location with respect to a storage location in which a previous data value for a previous portion that immediately precedes the next portion in the data stream is stored, wherein the storage locations in which the possible data values for the next portion are stored and the storage location in which the previous data value for the previous portion is stored are included in a set of storage locations, each storage location in the set of storage locations containing a data value for an associated portion of the data stream, wherein different combinations of possible data values for portions of the data stream represent different versions of the data stream.

10. The system of claim 9 wherein the processor is further configured to process each version of the data stream to determine if the version includes data associated with an attack.

11. The system of claim 10 wherein the processor is configured to process each version of the data stream to determine if the version includes data associated with an attack at least in part by determining whether the version includes data that matches an attack signature.

12. The system of claim 10 wherein the processor is further configured to, in the event it is determined that a first version of the data stream includes data associated with an attack but a second version of the data stream does not, determine whether the data stream is associated with an attempt to generate a false indication that a target host associated with the data stream is being or has been attacked.

13. The system of claim 10 wherein the processor is further configured to, in the event it is determined that a first version of the data stream includes data associated with an attack but a second version of the data stream does not, determine whether the data stream is associated with an attempt to evade detection of an attack on a target host with which the data stream is associated.

14. The system of claim 10 wherein the processor is further configured to generate an alert if it is determined that a version of the data stream includes data associated with an attack.

15. The system of claim 10 wherein the processor is further configured to generate an alert if it is determined that a first version of the data stream includes data associated with an attack but a second version of the data stream does not include data associated with the attack.

16. The system of claim 9 wherein the processor is further configured to determine that a subsequent portion of the data stream that immediately follows said next portion has only one possible data value; storing the one possible data value in a subsequent portion storage location, and identifying the subsequent portion storage location as the next location with respect to each of the storage locations in which a possible value of said next portion is stored.

17. The system of claim 9 wherein the processor is further configured to generate an alert if it is determined that a portion of a data stream is associated with an attempt to evade or mislead a network security process.

18. The system recited in claim 17 wherein the network security process comprises an intrusion detection process.

19. The system recited in claim 18 wherein the intrusion detection process comprises a process running on an intrusion detection system connected at an observation node and configured to monitor packets being sent to a target host located at a network node other than the observation node.

20. An article of manufacture for providing network security, the article of manufacture comprising: at least one non-transitory processor readable medium; and instructions stored on the at least one medium; wherein the instructions are configured to be readable from the at least one medium by at least one processor and thereby cause the at least one processor to operate so as to:
- determine that a next portion of a data stream being reconstructed has more than one possible data value;
- generate a plurality of possible data values for the next portion of the data stream, wherein each of the plurality of possible data values represents a different version of the next portion of the data stream;
- store each generated possible data value in a corresponding storage location associated with the data stream; and
- identify each storage location in which a possible data value for the next portion is stored as a next location with respect to a storage location in which a previous data value for a previous portion that immediately precedes the next portion in the data stream is stored, wherein the storage locations in which the possible data values for the next portion are stored and the storage location in which the previous data value for the previous portion is stored are included in a set of storage locations, each storage location in the set of storage locations containing a data value for an associated portion of the data stream, wherein different combinations of possible data values for portions of the data stream represent different versions of the data stream.

\* \* \* \* \*